No. 627,431. Patented June 20, 1899.
S. M. LITTELL.
SEED PLANTER.
(Application filed Nov. 4, 1898.)
(No Model.) 2 Sheets—Sheet 1.

WITNESSES:
Donn Twitchell
H. L. Reynolds.

INVENTOR
Samuel M. Littell.
BY
Munn
ATTORNEYS.

No. 627,431. Patented June 20, 1899.
S. M. LITTELL.
SEED PLANTER.
(Application filed Nov. 4, 1898.)
(No Model.) 2 Sheets—Sheet 2.

WITNESSES:
Donn Twitchell
H. L. Reynolds.

INVENTOR
Samuel M. Littell.
BY
ATTORNEYS.

UNITED STATES PATENT OFFICE.

SAMUEL M. LITTELL, OF PLEASANTON, KANSAS, ASSIGNOR OF ONE-THIRD TO MILAN D. LITTELL, OF SAME PLACE.

SEED-PLANTER.

SPECIFICATION forming part of Letters Patent No. 627,431, dated June 20, 1899.

Application filed November 4, 1898. Serial No. 695,501. (No model.)

*To all whom it may concern:*

Be it known that I, SAMUEL M. LITTELL, of Pleasanton, in the county of Linn and State of Kansas, have invented a new and Improved Seed-Planter, of which the following is a full, clear, and exact description.

My invention relates to an improvement in seed-planters which have been designed particularly for planting corn, but which may be applied to planters used for planting any kind of seed.

My invention comprises a seed-plate having a number of rows of seed-containing holes and a slide having a single hole therein, said slide being adjustable beneath the seed-plate, so as to bring its hole in registry with holes in any one of the rows in the seed-plate, whereby the number of seed dropped may be varied while the planter is in use.

My invention further comprises the novel features hereinafter described and claimed.

Reference is to be had to the accompanying drawings, forming a part of this specification, in which similar characters of reference indicate corresponding parts in all the figures.

Figure 1:
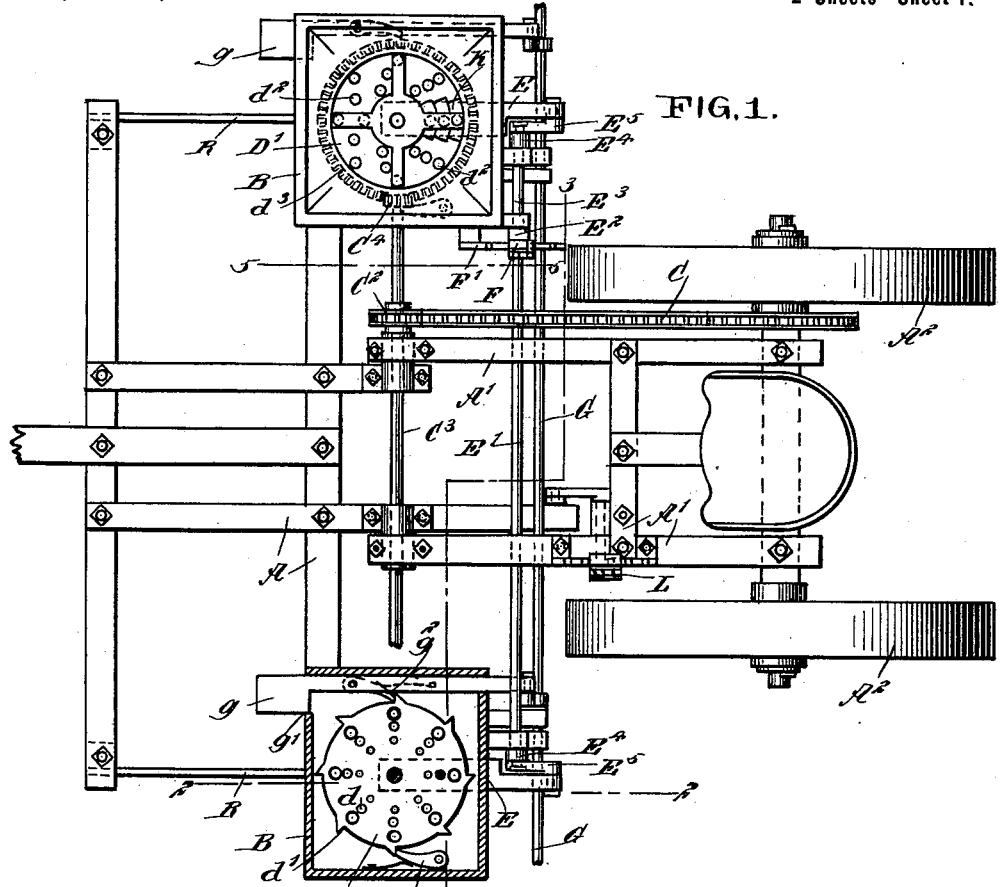
Figure 2:
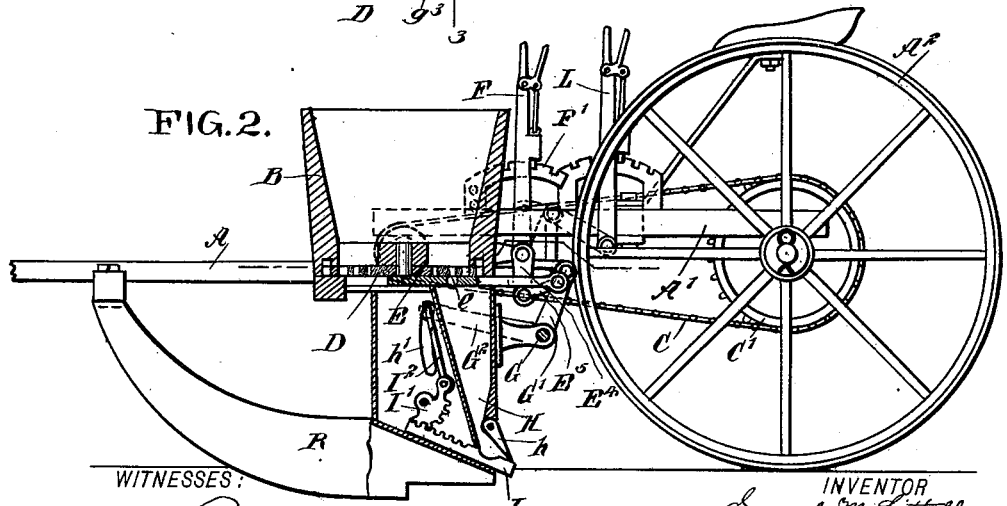
Figure 3:
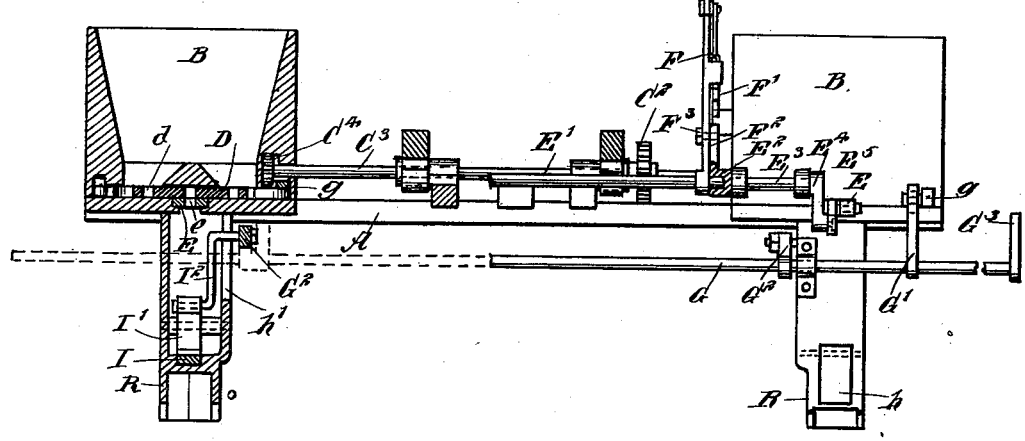
Figure 4:
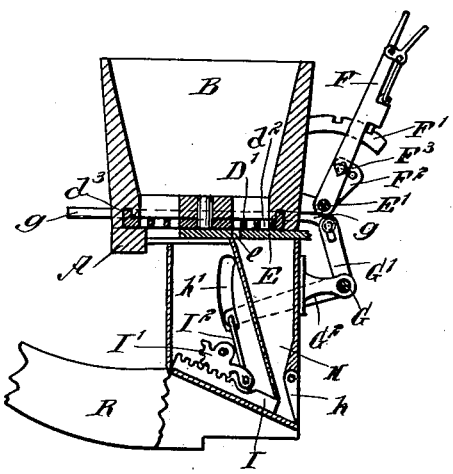
Figure 5:
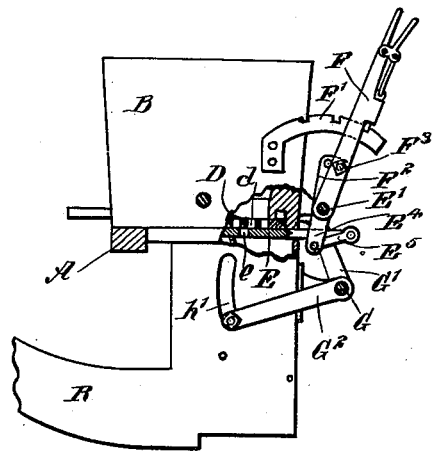

Figure 1 is a top plan view of a corn-planter with my device attached, one hopper being shown in section. Fig. 2 is a side elevation of a planter with the hopper and seed-dropping mechanism in section. Fig. 3 is a cross-sectional elevation taken upon the line 3 3 of Fig. 1. Fig. 4 is a section taken on the line 2 2 of Fig. 1, and Fig. 5 is a section taken upon the line 5 5 of Fig. 1 with one corner of the hopper broken away.

The object of my invention is to provide means by which the number of seed being dropped may be quickly varied while the planter is in use and without stopping its forward motion. In some fields certain portions of the ground are much richer than others and will consequently support a larger number of plants than the poorer sections. It often happens, too, that the richer ground is the one which is the harder to get the seed to grow in. For both of these reasons it is advisable in such ground to plant a larger number of seed than in the poorer ground. This result is obtained by the mechanism hereinafter shown and described.

My device may be applied to any planter having a seed-plate of the general form of that shown in the drawings. The frame of the planter may be of any ordinary construction. I have herein shown a construction which is common in connection with corn-planters. The part A is the forward portion of the frame, to which the tongue is attached and which supports the hoppers B. This forward portion of the frame is hinged upon the rearward portion A', the latter being mounted upon the axle of the wheels A². A lever L is provided, which is connected to the two parts of the frame in such manner that the forward frame may be raised, so as to remove the runners R from the ground when desired. Such construction may be of any suitable form, and the same not being any part of my invention is not herein described in detail, as it is common to planters of this character.

I have herein shown two forms of seed-plate and means for operating the same, either of which may be used in connection with my invention. The seed-plate D (shown within the hopper which is sectioned in Fig. 1) is a circular plate mounted upon a central pivot and provided with more than one ring of seed-openings $d$. In this plate the same number of holes is shown in each one of the rings; but the holes in each ring vary in size from those in the other rings. As herein shown, the outer row of holes is the largest and the inner row the smallest, three rows being shown. If the seed is being discharged through the outer row of holes, a larger number will be discharged than when the inner row of holes is used, and the variation is accomplished by adjusting the mechanism so as to use any one of the rows desired.

The plate D is provided with ratchet-teeth $d'$ upon its periphery, adapted to be engaged by a spring-held pawl $g^2$, mounted upon a sliding bar $g$, said bar being mounted within guides adjacent the periphery of the plate. This slide $g$ is connected by one end with a crank G', mounted upon a cross-shaft G, said shaft being the oscillating shaft ordinarily used in connection with check-row devices. These check-rowing devices ordinarily give the shaft an oscillating movement, which will result in giving the bars $g$ similar oscillating movement, by which the seed-plate D will be given an intermittent forward rotation. The plate D is prevented from moving beyond its proper position by one of the teeth $d'$ striking upon the surface $g'$ of the slide $g$.

Mounted to slide centrally beneath the seed-plate D is a bar E, by which the dropping of the seed is controlled. This bar is provided with a single hole $e$, which is at least equal in size to the larger hole in the seed-plate D, and preferably somewhat larger in size. This bar is connected, by means of a link $E^5$, with one end of a crank $E^4$, said crank being secured upon a cross-shaft $E'$. This cross-shaft is provided with an operating-lever F, which is provided with means adapted to secure it to a segmental bar $F'$, so that the controlling-bar E may be held in any one of these three positions, so that the hole $e$ therein may register with the holes in any one of the rows in the seed-plate. When the bars E are adjusted so as to be in registry with the outermost row of holes, the other rows of holes will be inoperative and the outermost row only will be used for discharging seed. The hoppers are provided with cut-offs K of any desired construction, by which the surplus seed is held back. It is evident that by shifting the position of the lever F the seed-controlling bars E may be readily adjusted so as to use any one of the rows of holes $d$ in the seed-plate, and consequently that the number of seed being dropped may be quickly varied without stopping the planter.

In the hopper upon the opposite side of the planter as shown in Fig. 1 is shown a seed-plate designed for use where the seed is being drilled. This plate is provided with plural rows of holes; but the holes in each of the rows are of the same size, the holes being preferably designed to hold one seed each. The number of holes in each of the rows is, however, different, the outermost row having the greater number of holes. The plate is provided on its outer periphery with teeth $d^3$, adapted to be engaged by pinion $C^4$, mounted upon the ends of a cross-shaft $C^3$. This pinion is at sufficient distance above the surface of the plate $D'$ so that it will not interfere with the seed-plate, such as shown at D. The teeth $d^3$ project above the plate $D'$ a sufficient distance to engage the pinion $C^4$. The shaft $C^3$ is rotated by means of a sprocket-chain C, which passes over a sprocket-wheel $C'$ upon the main axle of the planter and a sprocket-wheel $C^2$ upon the shaft $C^3$. The seed-controlling slide E is of exactly the same construction as that described and is adjusted to register with any one of the rows of holes in the plate $D'$. The innermost row contains six holes, the middle row seven, and the outermost row eight, as shown in the drawings. It is thus evident that by shifting the bars E either six, seven, or eight seeds may be dropped in going a certain distance. The holes $d^2$ may be made so as to hold one seed, if desired, or a greater number.

In some cases it is desirable that one hopper be thrown out of use while the other is used for planting. In order to secure this result, the cross-shaft $E'$, by which the bars E are controlled, is made in two parts, one section $E^2$ being separate from the body of the shaft. To the short section $E^3$ is secured a collar $E^2$, which is provided at one end with a socket adapted to receive the end of the shaft $E'$. This collar $E^2$ has an arm $F^2$, projecting upward alongside of the lever $F'$, adapted to be secured thereto by means of a bolt $F^3$. By this means the relative position of the lever F and the arm $F^2$ may be adjusted so that when one of the bars E is in position and its hole is in register with one row of holes $d$ the bar upon the opposite side of the planter will be in position to locate its hole between two of the rows in the seed-planter, and consequently that seed-plate will not drop any seed.

In connection with this device a positive seed-discharge is shown. The seed when delivered from the hopper falls into the seed-chute H. The lower end of this seed-chute is closed by a swinging gate $h$, which will ordinarily prevent the discharge of the seed from the lower end of the seed-chute. This gate $h$ is located in the heel of the runner. Within the heel of the runner is also located a plunger or discharging-bar I, which is mounted to slide within guides, so that it will engage the lower end of the gate $h$ and force it outward, thus discharging the seed which rests in the lower end of the seed-chute H. The bar I is provided on its upper rear surface with teeth adapted to be engaged by a segment-gear $I'$, pivoted within the heel. This segment-gear has an arm, to which is connected a link $I^2$, the upper end of this link being connected to the end of an arm $G^2$, secured to a cross-shaft G. This cross-shaft G is the shaft which is operated by means of the check-rowing device. Whenever the bar $g$ is reciprocated to turn the seed-plate, the segment $I'$ and the bar I are reciprocated to discharge the seed from the bottom of the seed-chute. The gate $h$, swinging open promptly after the bar I, prevents any possibility of mud entering the heel of the runner, so as to prevent discharge of the seed. The bar I also forms a positive discharge for the seed.

With this device it is possible to control the quantity of seed being planted while the planter is under way, and thus to make the amount of seed correspond with the character of the soil within which it is placed. It is an easy matter to change the check-rowing plate, such as the plate D, for a drilling-plate, such as the plate $D'$ described.

Having thus fully described my invention, I claim as new and desire to secure by Letters Patent—

1. A dropping device for seed-planters, comprising a disk having circular rows of seed-containing holes, the rows being of different diameters, and the holes of different sizes for different rows, and a plate or bar movable beneath the disk and having a hole adapted to register with the holes in either ring, substantially as described.

2. A dropping device for seed-planters, comprising a rotatable disk having circular rows of seed-containing holes arranged at different distances from the center, and a plate or bar movable beneath the disk and having a hole adapted to be brought into registry with the holes of either row, substantially as described.

3. A dropping device for seed-planters comprising a seed-plate having seed-receiving holes therein of different size, a regulating-plate having a hole therein, and means for shifting the regulating-plate to bring its hole into registry with any one of the holes in the seed-plate, substantially as described.

4. A dropping device for seed-planters, comprising a rotatable disk having circular rows of seed-containing holes arranged at different distances from the center, a plate or bar movable beneath the disk having a hole adapted to be brought into register with the holes of either row, a cross-shaft carrying a crank, connections from the crank to the movable drop-controlling plate, and an adjusting-lever connected with the shaft, substantially as described.

5. A dropping device for seed-planters, comprising a disk having circular rows of seed-containing holes, the rings being of different diameters and the holes of different sizes for different rows, a plate or bar movable beneath the disk and having a hole adapted to register with the holes in either row, a rock-shaft connected with the drop-controlling plate, and an adjusting hand-lever connected with the rock-shaft, and provided with means for holding it in various positions, substantially as described.

6. A seed-planter, comprising a seed-delivering spout having a yielding closing member at its lower or discharge end, a plunger mounted in slides to reciprocate and to force the seed out and the closing member to yield, said plunger having a rack formed thereon, a pivoted segment-gear engaging said rack, and connections from the segment-gear to the planter-operating mechanism to oscillate it, substantially as described.

7. A dropping device for planters, comprising two seed-hoppers, a rotatable disk in each having circular rows of seed-containing holes arranged at different distances from the center, plates movable beneath each disk and each having a hole adapted to be brought into register with the holes of either ring, a cross-shaft carrying cranks, connections from the cranks to the movable drop-controlling plates, one of said cranks being adjustable to change the relation of the drop-controlling plates, and an adjusting-lever connected with the shaft, substantially as described.

8. A seed-planter, comprising a seed-delivering spout having a swinging gate closing its lower or discharge end, a plunger mounted in slides to reciprocate across the lower end of said spout, and to force the gate and seed outward, said plunger having a rack formed thereon, a pivoted segment-gear engaging said rack, and connections from the segment-gear to the planter-operating mechanism to oscillate it, substantially as described.

9. A dropping device for seed-planters, comprising two seed-hoppers, a rotatable disk in each having circular rows of seed-containing holes arranged at different distances from the center, drop-controlling plates movable beneath each disk and having a hole adapted to be brought into register with the holes of either row, a cross-shaft in two sections, a crank upon each section, connections from the crank to their respective drop-controlling plates, means for disconnecting the two sections and for adjusting the position of the cranks relative to each other, and an operating-lever connected with the cross-shaft, substantially as described.

SAMUEL M. LITTELL.

Witnesses:
A. M. KENT,
L. H. KOEPSEL.